United States Patent [19]
Ruzic

[11] 3,886,908
[45] June 3, 1975

[54] ROTARY INTERNAL COMBUSTION ENGINE

[76] Inventor: Ivan Ruzic, 2110 Main St. E., Saskatoon, Saskatchewan, Canada

[22] Filed: Dec. 14, 1973

[21] Appl. No.: 425,168

[30] Foreign Application Priority Data
Oct. 18, 1973 Canada.............................. 183753

[52] U.S. Cl. .............................................. 123/8.31
[51] Int. Cl. ............................................. F02b 53/08
[58] Field of Search ........ 123/8.15, 8.17, 8.27, 8.31

[56] References Cited
UNITED STATES PATENTS

| | | | |
|---|---|---|---|
| 2,124,542 | 7/1938 | Chisholm............................ | 123/8.27 |
| 2,298,525 | 10/1942 | Briggs................................. | 418/86 X |
| 2,349,481 | 5/1944 | Wallace............................... | 123/8.17 |
| 3,121,421 | 2/1964 | Peterson............................. | 123/8.31 |
| 3,297,006 | 1/1967 | Marshall............................. | 123/8.31 X |
| 3,398,725 | 8/1968 | Null.................................... | 123/8.17 X |

FOREIGN PATENTS OR APPLICATIONS

| | | | |
|---|---|---|---|
| 627,392 | 10/1927 | France................................ | 123/8.31 |
| 486,195 | 5/1938 | United Kingdom................. | 123/8.31 |

Primary Examiner—C. J. Husar
Assistant Examiner—Leonard L. Smith
Attorney, Agent, or Firm—Berman, Bishoff & Platt

[57] ABSTRACT

An internal combustion rotary engine including a main stator casing in which a main rotor of circular cross-section is rotatably mounted, the casing and rotor combining to form two combustion chambers and two intake chambers. Three or four vanes are mounted in the main rotor so as to maintain sliding contact with the main casing. Two compressors are arranged on opposite sides of the main casing, each compressor having a compressor rotor and compression chamber. Short passages extend between each compression chamber and each intake chamber and passage means are provided for communicating each compression chamber with a combustion chamber at predetermined intervals. In operation, a quantity of fuel and air is drawn into each intake chamber by the passage of a vane therethrough and is then driven into a compression chamber by the subsequent passage of the following vane. Preferably as the mixture is driven into the compression chamber, the mixture is precompressed to a certain extent. The mixture then undergoes final compression in the compression chamber after which it is released into the adjacent combustion chamber where the mixture is ignited.

8 Claims, 9 Drawing Figures

ROTARY INTERNAL COMBUSTION ENGINE

BACKGROUND OF THE INVENTION

This invention relates to internal combustion rotary engines and more particularly to engines of this type having vanes mounted in the rotor for engaging the stator casing of the rotor.

Internal combustion rotary engines are well known and consist of at least two basic types, the first being the type having an eccentrically mounted rotor with a cross-section which is roughly triangular and a lobular-shaped stator casing for the rotor and the second being the type having a generally round rotor which rotates about its centre and which has vanes mounted in or to the rotor which generally engage the adjacent inner surfaces of the stator casing at all times. With the latter type of rotary engine the vanes are often mounted so that they can move, radially inwardly or outwardly as the rotor rotates depending on whether the adjacent inner surface of the stator casing is coming closer to the periphery of the rotor itself or is moving away from the periphery of the rotor.

Examples of both types of rotary engines are illustrated in U.S. Pat. No. 3,240,189 to F. Stumpfig which issued on Mar. 15, 1966. In particular, examples of the second type of engine are shown in FIGS. 1 to 3 of this patent. The engine shown in FIG. 2 of this patent is particularly noteworthy as it bears some resemblance to the engine design of the present application. In this engine the rotor has a generally circular cross-section and is mounted at its centre in the centre of a stator casing for the rotor. The stator casing has an oval shape taken in the plane of rotation of the rotor so that a chamber is formed on the left and the right side of the rotor between the rotor and the stator casing. Eight rather thin vanes are mounted in the rotor, each capable of moving radially inwardly or outwardly as the rotor rotates so as to maintain contact with the adjacent surface of the stator casing.

In the engine shown and described in U.S. pat. No. 3,240,189, only the air itself is drawn into the chamber on the right side of the engine by the suction created by the rotating vanes. Air trapped between adjacent vanes is compressed into a small depression formed in the periphery of the rotor between every two adjacent vanes upon further rotation of the rotor. It should be noted that this arrangement requires that one quarter of a rotation of the rotor be used to accomplish the intake step or phase and that another quarter of the rotation of the rotor be used to accomplish only a compression step. In the engine of the present invention the one quarter of a rotation in which compression only takes place is avoided which gives the present engine certain advantages which will become apparent hereinafter.

The engine disclosed by Stumpfig also employs an evaporating chamber mounted at the periphery of the rotor. In this chamber the fuel is evaporated and then mixed with air, after which the resulting mixture is ignited. The present engine does not require such an evaporating chamber as the fuel is evaporated and mixed with air before the intake phase. Moreover the present engine ensures that the vaporized fuel and air are thoroughly mixed by conducting the fuel and air mixture through the center of the rotor, which preferably has a hollow interior, so that the rotation of the rotor mixes the fuel and air thoroughly. Also, by avoiding the need for an evaporating chamber at the location disclosed by Stumpfig, the present engine achieves greater compression of the fuel and air mixture when the mixture is ignited.

It will also be noted that the engine shown in FIG. 2 of the Stumpfig patent uses one quarter of the rotation of the rotor for the power cycle or phase and another quarter of the rotation to exhaust the burnt gases from the engine. In the preferred embodiment of the present engine also, one quarter of the rotation of the rotor is employed for the power cycle and one quarter of the rotation of the rotor is employed for the exhaust step but, unlike the Stumpfig engine, the power cycle and the exhaust cycle take place at the same location in the stator casing. Also in one preferred embodiment, two power cycles can be taking place at the same time on opposite sides of the rotor. It will readily be appreciated that these differences make the present engine very advantageous from the standpoint of engine efficiency and the power which can be developed by the engine.

The present engine employs compression means located outside the main stator casing for the main engine rotor for compressing the fuel and air mixture prior to combustion. Preferably the compression means comprises one or more compressor rotors; each rotor mounted in a compressor stator casing. It is known to use such compression means outside or adjacent the main stator casing but generally the compressor rotor is mounted on the same shaft as the main engine rotor so that the compressor stator is mounted adjacent one of the flat sides of the main stator. This known arrangment generally gives rise to a need for complex and usually long passageways between the compression chamber of the compression means and the chambers formed by the rotor in the engine itself. These passageways are difficult to construct, difficult to maintain and generally inefficient for their intended use.

With a preferred embodiment of the present invention, the need for long and complex passages interconnecting the compression chamber and the interior of the main stator for the engine rotor is avoided. The interconnecting passages used in the present engine are very short and generally straight. Such passages are permitted with the present invention by placing each compression means at the periphery of the main rotor rather than at one of the flat sides of the main rotor. Thus each compressor rotor is mounted on a separate shaft which preferably is parallel to the shaft on the main rotor at which combustion takes place. Drive means are provided so that each compressor rotor is driven by rotation of the main rotor.

Unlike all previous engines of the rotary type having separate compression means, the present engine sucks the fuel and air mixture into at least one intake chamber formed between the main rotor and the main stator casing and then transfers the mixture in the intake chamber to the compression chamber by way of passage means. In previous engines, the air or fuel-air mixture is generally introduced into the compression chamber directly from the outside atmosphere. Thus the air or fuel-air mixture is relatively cold when it is introduced into the compression chamber and it remains relatively cold, except for the heating which takes place as a result of compression, until introduced into the combustion chamber. This results in poor engine performance and efficiency and lessens spark plug life.

By sucking the fuel and air mixture into an intake chamber which is in the main stator casing before the introduction of the mixture into the compression chamber, the present engine provides simple and direct means for heating the fuel and air mixture. It is clear that the walls of the intake chamber, which are formed by part of the main rotor and the main stator casing, will be relatively hot at least after the engine has operated for a short period of time. This is because combustion takes place in the same stator casing and along side of the main rotor, both of which will of course be heated considerably thereby. The fuel and air mixture is additionally heated by the fact that the mixture is conducted through the centre of the main rotor, as previously mentioned, before being sucked into the intake chamber. Because the only fuel and air mixture to contact the spark plug is in a heated state, spark plug life is increased considerably.

Furthermore, with an appropriate embodiment of the present engine design it is possible to achieve a two step compression cycle. An initial pre-compression of the fuel and air mixture can take place in the transfer of the mixture from the intake chamber to the compression chamber located outside the main stator casing. Then a final compression of the mixture takes place in the compression chamber itself. With this type of a compression process, it is possible to achieve a relatively high final pressure in the compressed mixture without undue strain or wear of the engine parts. Compression in the present engine is accomplished smoothly with little resulting engine vibration.

Accordingly it is an object of the present invention to provide an internal combustion rotary engine of the movable vane type wherein the compression cycle is carried out independently of the main rotor which forms at least a portion of the combustion chamber or chambers and wherein the intake cycle is carried out at least in part by the main rotor.

It is a further object of the present invention to provide an internal combustion rotary engine of the movable vane type wherein a main stator casing and main rotor define both a combustion chamber and an intake chamber but separate compression means including a compression chamber are provided for carrying out at least the final stage the compression cycle which results in a mixture of fuel and air being placed under relatively high pressures.

Another object of the present invention is to provide an internal combustion rotary engine wherein the mixture of fuel and air is heated from direct contact with the peripheral surfaces of the main rotor against which combustion takes place before the mixture is compressed by the compression means and fed into the combustion chamber.

An additional object of the engine of the present invention is to provide a rotary engine capable of achieving relatively high pressures upon compression of the fuel and air mixture without undue wear or strain on the engine parts or components.

A further object of the present invention is to provide an internal combustion engine wherein the power and exhaust cycles can take place at the same location in the main stator casing.

SUMMARY OF THE INVENTION

Accordingly, the internal combustion rotary engine of the present invention includes a main stator casing defining a main rotor chamber therein and a main rotor rotatably mounted in the main rotor chamber and combining with the main stator casing to form separate combustion chamber means and intake chamber means. Vanes are mounted in the main rotor such that the radially outer end of each vane maintains contact with an adjacent internal surface of the main stator casing during rotation of the main rotor. Each vane passes through the combustion and intake chamber means respectively during rotation of the main rotor. Intake passage means are provided for transfering a mixture of fuel and air into said intake chamber means and exhaust passage means are provided for transferring exhaust gases resulting from combustion out of said combustion chamber means. Ignition means are used to ignite the mixture of fuel and air when it reaches the combustion chamber. Compression means are provided which include a compressor stator casing defining a compressor rotor chamber, a compressor rotor rotatably mounted in said compressor rotor chamber and combining with said compressor stator casing to form a compression chamber, said compressor stator casing being located radially outwardly from the centre axis of the main rotor and separated from said main rotor chamber. First passage means are provided to transfer a quantity of the mixture of fuel and air in the intake chamber means to the compression chamber and second passage means are also provided to transfer a compressed quantity of said mixture of fuel and air from the compression chamber to the combustion chamber means. Release means are employed to release the compressed quantity of fuel and air into the combustion chamber means through the second passage means in timed relation with respect to the passage of each of the primary vanes through the combustion chamber means. The release means comprise recesses in the periphery of the main rotor, one recess being located to the rear of and spaced apart a predetermined distance from each primary vane. The predetermined distance determines the time of release of the compressed quantity of fuel and air into said combustion chamber.

The engine of the present invention operates in the following manner. A quantity of the fuel and air mixture is drawn into the intake chamber means by the passage of each primary vane through this chamber. This quantity of fuel and air is then driven into the compression chamber through the first passage means by the subsequent passage of the next primary vane through the intake chamber means. The quantity of fuel and air is compressed by the compression means and then released into the combustion chamber means by the release means. The compressed quantity of fuel and air in the combustion chamber means is ignited and explodes, the force of the explosion pushing one of the vanes through the combustion chamber means and thus rotating the main rotor. Finally, exhaust gases in the combustion chamber means are removed therefrom by the passage of the vane following said one of said vanes through the combustion chamber means.

In one preferred embodiment of the present engine, there are two combustion chambers and two intake chambers formed between the main rotor and the main stator casing. In this embodiment, if three primary vanes are distributed about the main rotor, six power cycles or strokes can be accomplished for every revolution of the main rotor.

In one preferred embodiment, the size of the compression chamber immediately prior to compression in it is made smaller than the size of the intake chamber feeding the compression chamber so that a certain amount of pre-compression of the fuel and air mixture takes place during the step in which the fuel and air mixture is driven from the intake chamber to the compression chamber. This arrangement permits the present engine to achieve high compression with little engine wear or vibration.

Other advantages and embodiments of the present invention will become obvious upon consideration of the accompanying drawings showing two preferred embodiments of the present invention and the following detailed description.

DETAILED DESCRIPTION OF PREFERRED EMBODIMENTS

Figure 1:
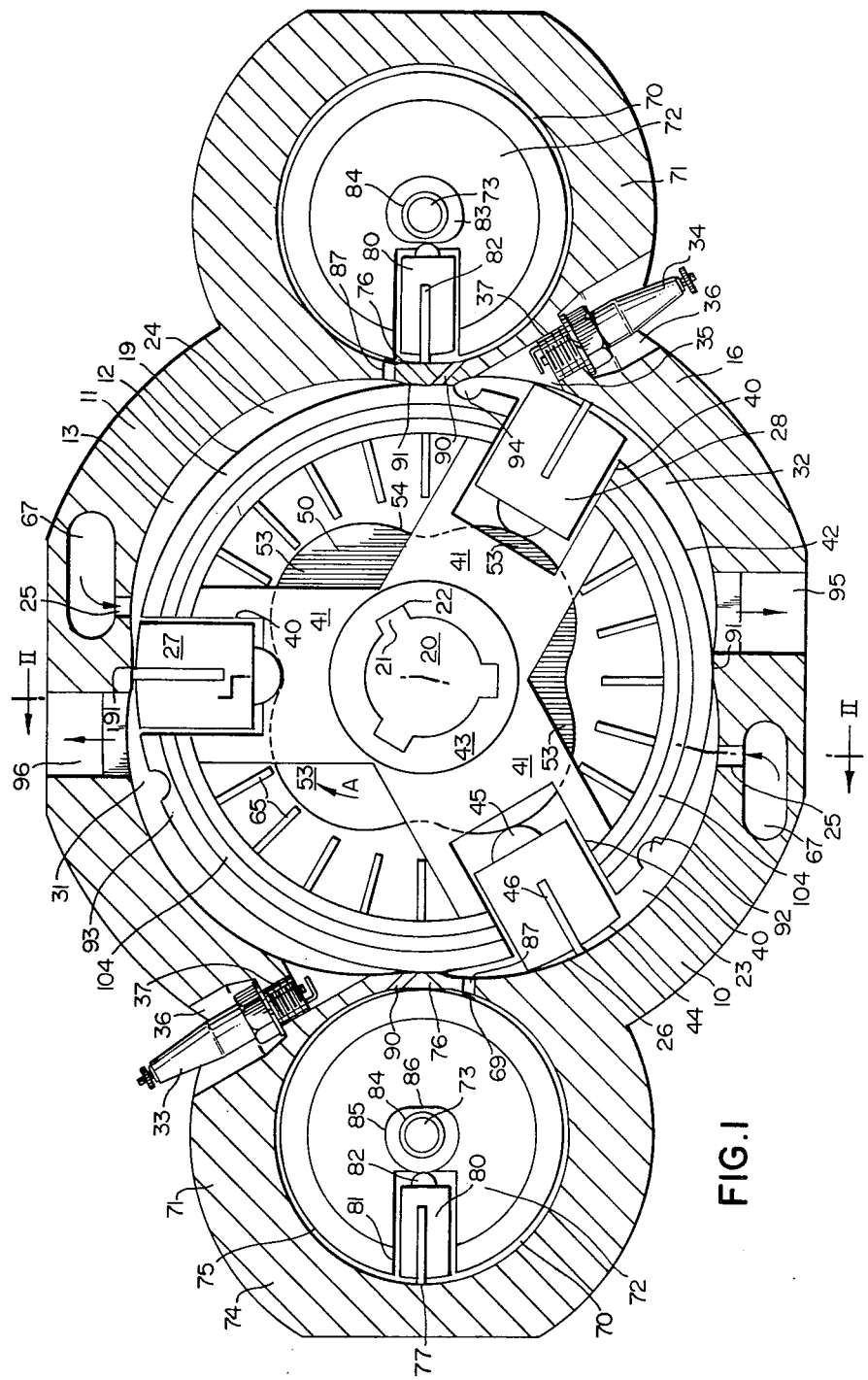
FIG. 1 is a sectional side view taken along the line I—I of FIG. 2 illustrating one preferred embodiment of the present engine having three primary vanes.

FIG. 1 is a sectional side view of one embodiment of the internal combustion rotary engine of the present invention which has been generally designated by the numeral 10. The central portion of the engine consists of two main parts, the main stator casing 11 and the main rotor 12 rotatably mounted in the casing 11. The main stator casing has a generally cylindrical exterior and a hollow interior forming a main rotor chamber 13 for the main rotor. The main stator casing has two generally flat front and rear walls, designated by 14 and 15 respectively in FIG. 2. These front and rear walls combine with the side walls 16 to define the main rotor chamber 13.

The main rotor 12 has a generally disc-like configuration with flat end walls 17 and 18 and a cylindrical side wall 19 at the periphery of the rotor. The main stator casing and the main rotor are constructed so that the interior surface of the front wall 14 lies as close as possible to the end wall 17 of the main rotor and the interior surface of the rear wall 15 of the main stator casing lies as close as possible to the end wall 18 of the main rotor. The fit between the main rotor and the main stator casing must of course not be too tight so that free rotation of the main rotor in the main rotor chamber 13 is not prevented or hindered.

The main rotor 12 is mounted on a main shaft 20 which rotates with the main rotor and forms the power shaft for the engine. In the preferred embodiment shown, the main shaft 20 has been constructed with three splines 21 which engage corresponding recesses 22 in the main rotor to prevent rotation of the main rotor with respect to the main shaft 20.

The main rotor 12 and main stator casing 11 combine to form separate combustion chamber means and intake chamber means for the engine. A mixture of fuel and air is drawn into the intake chamber means by rotation of the main rotor which causes vanes mounted on the main rotor to pass through the intake chamber means and thus suck the mixture of fuel and air into the intake chamber means. The combustion cycle of the engine takes place of course in the combustion chamber means wherein a compressed quantity of fuel and air is ignited. The resulting explosion drives one of the vanes mounted on the main rotor through the combustion chamber means which in turn results in a transmission of power through the main rotor and main shaft 20. In the preferred embodiment shown in FIG. 1, the intake chamber means comprises two crescent-shaped intake chambers 23 and 24 located on opposite sides of the main rotor 12. Each of the intake chambers extends along approximately one-quarter of the outer periphery of the main rotor and is fed with a mixture of fuel and air through a number of intake openings 25 located at one end of each of the intake chambers. In the engine shown in FIG. 1, the main rotor 12 rotates in a clockwise direction and has three primary vanes 26, 27 and 28 distributed evenly about its periphery. Thus the intake openings 25 for each intake chamber are located at the end of the intake chamber which is engaged first by each primary vane as the main rotor rotates.

The combustion chamber means in the engine shown in FIG. 1 comprise two crescent-shaped combustion chambers 31 and 32 located at opposite sides of the main rotor 12. Each of the combustion chambers extends along approximately one-quarter of the outer periphery of the main rotor. Ignition means are provided for igniting the compressed mixture of fuel and air in each of the combustion chambers and, in the preferred embodiment shown, comprise two spark plugs 33, and 34 mounted in the main stator casing 11.

Each of the spark plugs is located at the end of its respective combustion chamber which is first engaged by each of the primary vanes as the main rotor rotates. The ignition end of each spark plug opens into a small recess 35 in the outer wall of the combustion chamber. This recess can be quite small and need only be as wide as the inner end of the spark plug. Each recess 35 does not extend from the interior of the front wall 14 to the interior of the rear wall 15 so that the outer end of each primary vane can pass smoothly along the interior surface of the main stator casing without engaging the walls of the recess 35. Each of the spark plugs fits into a hole 36 in the main stator casing 11 designed to accommodate the spark plug. A short, threaded passageway 37 extends between each of the holes 36 and its respective recess 35. Each spark plug is threaded into its respective passageway 37 so as to be firmly mounted in the main stator casing 11.

The primary vanes 26, 27 and 28 are mounted for sliding movement in three vane passageways 40 distributed evenly about the periphery of the main rotor 12. The passageways 40 are each formed in a spoke 41 which extends from the main shaft 20 to the cylindrical outer casing of the main rotor 12. The three spokes 41 are joined at the centre to a hub 43 which is directly mounted to the main shaft 20. Thus the three spokes 41 support the cylindrical outer casing 42 and the three primary vanes 26, 27 and 28 on the main shaft as the rotor rotates. Each of the primary vanes has a generally rectangular cross section and a curved outer end 44 forming a cylindrical arc adjacent the curved interior surfaces of the main stator casing. The inner end of each primary vane has a semi-spherical protuberance 45 extending radially towards the main shaft 20 for purposes indicated hereinafter. Also, each primary vane is fitted with one or more sealing members 46 which engage the interior peripheral surfaces of the main stator casing as the rotor rotates. The sealing members of course prevent any fuel and air mixture or combustion gases from passing between the primary vane and the adjacent peripheral surface of the main stator casing as the primary vane passes through either an intake chamber or a combustion chamber. The sealing means also prevent contact between the main body of the primary vane and the main stator casing so that the vanes and stator casing are not worn out quickly because of frictional contact between them. The sealing members may be made out of any suitable material which has good wearing properties, and which can provide a good sealing contact surface with the main stator casing. In the embodiment shown, only one sealing member is employed and this member is embedded deeply into the main body of the primary vane so that it is firmly supported and is not liable to work it self loose from the primary vane during operation of the engine.

It will be readily recognized that, at least at high engine speeds, each of the primary vanes will naturally maintain contact with the interior peripheral surfaces of the main stator casing as the main rotor rotates due to the high centrifugal forces exerted on each of the vanes. However, at lower engine speeds, it is desirable to provide means for maintaining a sealing contact between the outer end 44 of each of the primary vanes and the main stator casing. In the embodiment shown in FIGS. 1 and 2, cam means 50 are provided to engage the protuberances 45 at the inner ends of the vanes. As shown clearly in FIG. 2, the cam means 50 consists of a flat, rigidly mounted member located in the centre of the primary rotor 12. The cam means is rigidly attached to the front wall 14 of the main stator casing by support means 51 which may consist of a number of rigid members or a single tubular member. The cam means 50 has a large hole 52 in the centre thereof to accomodate the main shaft 20 and the hub 43 for the main rotor. The cam means 50 is shaped to form four large protuberances 53 located every 90° about the circumference of the main shaft 20. The protuberances 53 combine to form a smooth camming surface 55 to engage each of the protuberances 45 of the primary vanes. The camming surface 54 is shaped so that, as the main rotor 12 rotates, each of the primary vanes is pushed outwardly by the camming surface as it enters either an intake chamber or a combustion chamber. As each of the primary vanes is leaving either an intake chamber or a combustion chamber, the camming surface retreats radially inwardly towards the main shaft so as to permit the primary vane to be pushed radially inwardly by the interior peripheral surfaces of the main stator casing. Thus, the primary vanes of the main rotor maintain a good sealing contact with the main stator casing even at low engine speeds.

Figure 2:
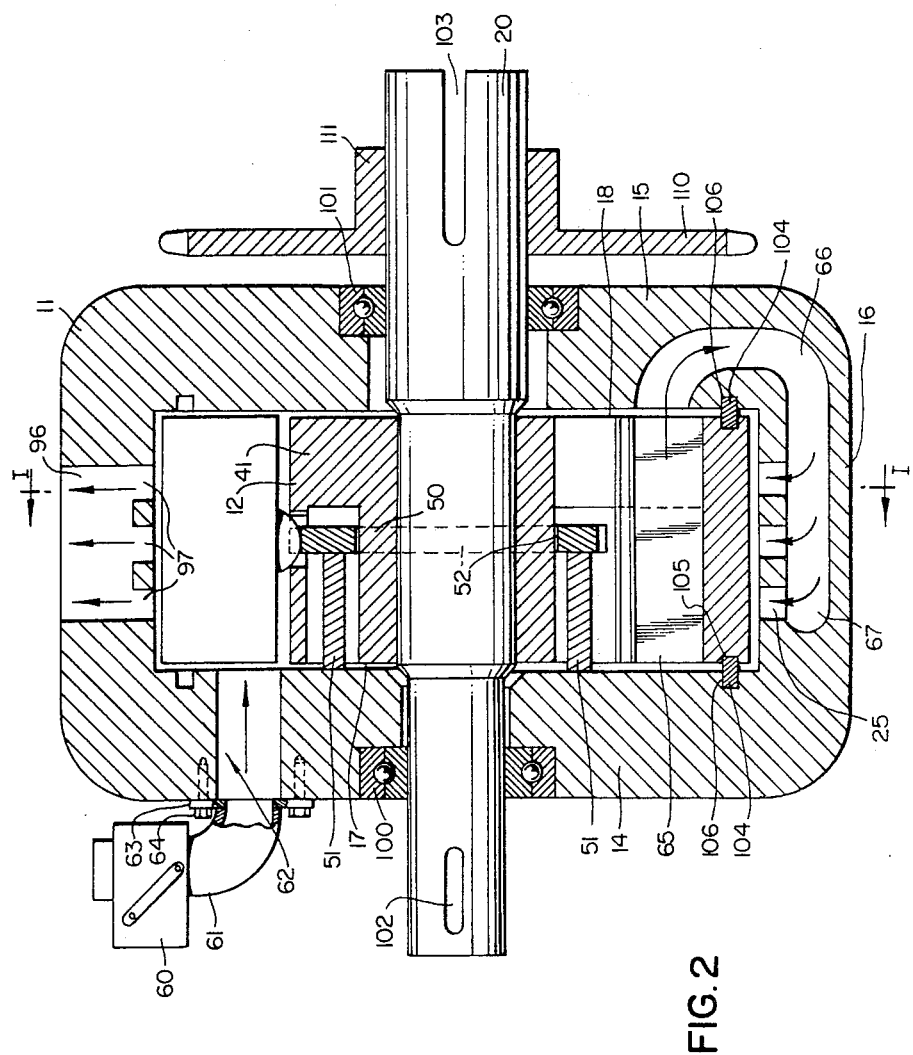
FIG. 2 is a sectional end view, taken approximately along the line II—II of FIG. 1, of the engine of FIG. 1.

The engine of the present invention provides a simple and efficient intake system for the fuel and air mixture which provides means for heating the fuel and air mixture even before it enters one of the intake chambers, and which thoroughly mixes the fuel and air mixture before it is sucked into one of the intake chambers. The cylindrical outer casing 42 and three spokes 41 combine to form a main rotor which has a substantially hollow interior. The fuel and air mixture is fed into the hollow interior from the carburetor or other suitable fuel and air mixing means through a pipe 61 and passageway 62 in the front wall 14 of the main stator casing (see FIG. 2). The delivery end of the pipe 61 is fastened securely to the front wall of the main stator casing by means of a flange 63 and bolts 64. Once the fuel and air mixture enters the hollow interior of the main rotor, it is free to circulate throughout the interior of the main rotor and is mixed by the rotating surfaces of the cylindrical outer casing 42 and the spokes 41. Additional mixing means may be provided in the form of radially extending fins 65. The fins 65 are attached at their outer ends to the inner wall of the cylindrical outer casing 42. Each fin 65 preferably extends across the width of the main rotor and inwardly towards the main shaft a distance which is sufficient to give each fin a maximum mixing effect while at the same time permitting sufficient clearance between the inner end of each fin and the cam means 50. If desired, each of the fins may be slanted in the lateral direction so as to drive the fuel and air mixture from the left side of the main rotor (as seen in FIG. 2) to the right side of the main rotor. Thus, the fins 65 can act as a fan to either pull or push the fuel and air mixture through the intake system of the engine as well as a mixer for the fuel and air mixture.

The fuel and air mixture is also heated in the interior of the main rotor because the cylindrical outer casing will become very hot after the engine has been operating for a period of time, the combustion chambers being immediately adjacent the cylindrical outer casing. The heat transfer from the cylindrical outer casing to the fuel and air mixture is increased with the use of the fins 65 since these can be constructed of a suitable heat conducting metal and have large surface areas in contact with the fuel and air mixture. It should also be noted that the fuel and air mixture assists in the cooling of the engine, and in particular the main rotor, since the cylindrical outer casing 42 will tend to be cooled by the fuel and air mixture as it in turn heats the fuel and air mixture.

The thoroughly mixed and heated fuel and air mixture is then drawn from the interior of the main rotor into each of the two intake chambers 23 and 24 by suitable intake passage means in the main stator casing. A suction is created in each of the intake chambers by the passage of one of the primary vanes therethrough and this suction provides the means for drawing the fuel and air mixture from the interior of the main rotor. In the embodiment shown in FIGS. 1 and 2 the intake passage means include two U-shaped passageways 66 formed in the rear wall of the main stator casing (only one of these passageways is shown in the drawings). Each of these U-shaped passageways feeds the fuel and air mixture into a straight passageway 67 located in the side walls 16 of the main stator casing. It will be noted from FIG. 1 that the two passageways 67 are located on opposite sides of the main rotor adjacent the intake ends of the intake chambers 23 and 24. Each of the passageways 67 feeds a number of the already mentioned intake openings 25 which extend between the inner wall of the passageway 67 and the outer wall of the intake chamber. The intake openings or ports 25 may take the form of a number of slots arranged one beside another across the width of the intake chamber. The length of each slot extends in the direction of rotation of the main rotor. The purpose of this slot arrangement (as opposed to one large opening into the intake chamber) is of course to provide a relatively smooth surface for the passage of each of the primary vanes over the intake openings 25.

The engine of the present invention also includes compression means for compressing a quantity of the mixture of fuel and air which has been drawn into the intake chamber means. The compression means include one or more compression chambers in which the fuel and air mixture is compressed after being driven from the intake chamber means to the compression chamber or chambers. Once the mixture of fuel and air has been compressed by the compression means it is fed to the combustion chamber means where, in a compressed state, it is ignited to drive one of the primary vanes through the combustion chamber means. In the engine of FIG. 1, two compression means are provided, one on each side of the engine 10. Each compression means comprises a compressor stator casing 71 and a compressor rotor 72 rotatably mounted therein. Each of the compressor rotors 72 is rigidly fixed to a rotatable shaft 73. The stator casing has of course generally flat front and rear walls (not shown) and generally cylindrical side walls 74 to encase the compressor rotor and define the compressor rotor chamber. Each of the compressor rotors 72 and its corresponding compressor stator casing 71 combine to form one of the aforementioned compression chambers 70. Thus the cylindrical peripheral surface 75 of each of the compressor rotors is spaced apart from the interior surfaces of the side walls 74 of the compressor stator casing about the circumferance of the compressor rotor except at that portion 76 of the side wall 74 which is closest to the main rotor 12. At portion 76 of side wall 74, the peripheral surface of the compressor rotor sealingly engages the side wall 74 so that none of the fuel and air mixture can ever pass between the rotor 72 and the side wall of the compressor stator casing at this point.

A single compressor vane 80 is mounted in each of the compressor rotors 72 so as to be radially slidable with respect to its respective compressor rotor. Each compressor vane is mounted in a housing 81 in the compressor rotor and may be constructed in a manner similar to that of the primary vanes 26, 27 and 28. Thus each of the compressor vanes can be constructed with a sealing member 77 adapted to sealingly engage the side walls 74 of the compressor stator casing and a semi-spherical protuberance 82. Cam means 83 are also provided for each of the compressor vanes 80 for engaging the protuberance 82 at the rear of each compressor vane. Each of the cam means 83 is rigidly mounted to either the front or rear wall of the compressor stator casing in a manner similar to that by which the cam means 50 for the main rotor is mounted. Also, each of the cam means 83 has a hole 84 in its centre for the passage of the shaft 73 through the cam means. The peripheral surface 85 of each of the cam means is generally cylindrical except for a flat portion 86 on the side of the cam means closest to the portion 76 of the side wall 74 of the compressor stator casing. It will be readily seen that the peripheral surface 85 will engage the semi-spherical protuberance 82 in such a manner that the compressor vane 80 will be maintained in contact with the interior surfaces of the side walls 74 at all times. When the outer end of the vane 80 approaches the portion 76, the peripheral surface 85 of the cam means will permit the vane 80 to slide radially inwardly and as the vane leaves the portion 76, the peripheral surface of the cam means will push the vane 80 radially outwardly.

The present engine is also fitted with first passage means 87 for transferring a mixture of fuel and air in the intake chamber means to the compression chamber of the compression means. In the preferred embodiment shown there are two first passage means 87, one located at one end of each of the intake chambers 23 and 24. The end of the intake chamber at which the first passage means is located is the end from which each of the primary vanes leaves the intake chamber. It will be readily seen that the passage of one of the primary vanes through one of the intake chambers will cause the mixture of fuel and air trapped in the intake chamber to be driven from the intake chamber through the first passage means and into the compressor chamber 70 communicating with the first passage means. Because of the location of the compression means immediately adjacent the periphery of the main rotor and midway between an intake chamber and a combustion chamber, the first passage means 87 can be made relatively short and straight. Thus the first passage means can be constructed very easily and very inexpensively and, due to the straightness of the passage means, they remain relatively clear of deposits.

In order to achieve a two-stepped compression of the fuel and air mixture as described hereinafter, it is preferable to place valve means 69 in each first passage means 87 and at one end thereof. The valve means 69 may comprise any suitable form of valve which permits the flow of the fuel and air mixture from the intake chamber into the compression chamber but which does not permit the mixture to flow in the opposite direction from the compression chamber into the intake chamber. The valve means shown comprises a small flap member at the end of the first passage means which enters into the compression chamber 70. This small flap member can be hinged at one side so as to open when the pressure of the fuel and air mixture in the first passage means is greater than the pressure of the fuel and air mixture in the compression chamber. A ball valve could also be used as the valve means 69 if desired.

The engine 10 is also provided with second passage means for transferring a compressed quantity of the mixture of fuel and air from the compression chamber to the combustion chamber means. The preferred embodiment of the engine shown in FIG. 1 has two second passage means 90, each of which consists of a relatively short straight passageway. One end of each second passage means is in constant open communication with its respective compression chamber 70 while the other end extends to a portion 91 of the side wall 16 of the main stator casing which sealingly engages the peripheral cylindrical surface of the main rotor 12. The end of each second passage means which is in open communication with the compression chamber is located immediately ahead of the portion 76 of the side walls 74 of the compressor stator casing taken in the direction of rotation of the compressor rotor. The other end of the second passage means will normally be closed by the peripheral surface of the main rotor as the rotor rotates but will be opened at selected intervals by release means. In the preferred embodiment of the engine shown in FIG. 1, the release means consists of three recesses 92, 93 and 94 in the peripheral surfaces of the main rotor 12. It will be readily seen that when one of the recesses is rotated to a position adjacent one of the second passage means 90 the compressed air in the compression chamber 70 will be released through the second passage means 90 and into the adjacent end of the combustion chamber 31 or 32. The portion 91 of the main stator casing which engages the peripheral surfaces of the main rotor must be of sufficient length taken in the direction of rotation of the main rotor so as to prevent the release of the compressed mixture into the adjacent end of the intake chamber. The compressed mixture of fuel and air will of course only be released into the combustion chamber when one of the recesses 92, 93 or 94 is brought into communication with both the second passage means 90 and one end of the adjacent combustion chambers.

Exhaust passage means are also provided in the present engine for transferring exhaust gases resulting from combustion in the combustion chamber means out of the combustion chamber means. In the preferred embodiment of FIG. 1 the exhaust passage means comprise two exhaust passageways 95 and 96 and are located at the ends of the combustion chambers opposite the ends in which the ignition means are located. As with the intake passage means, each of the exhaust passageways communicates with the combustion chamber by means of elongated slots 97 (see FIG. 2). In the embodiment shown, there are three slots for each of the exhaust passageways. The length of each slot 97 extends in the direction of rotation of the main rotor 12. This slot arrangement again permits each of the primary vanes to pass smoothly over the exhaust opening.

It will be readily understood that after the explosion in the combustion chamber has driven one of the vanes through the length of the combustion chamber, the next primary vane to pass through the combustion chamber will drive the gases resulting from the combustion from the combustion chamber through the slots 97 into the exhaust passageway 95 or 96.

Other desirable features used in the construction of the engine of the present invention are schematically shown in FIG. 2. These include bearing means 100 and 101 for the main shaft 20. Bearing means 100 are embedded in the front wall 14 of the main stator casing and could take the form of either ball or roller bearings mounted in a suitable casing. Bearing means 101 are embedded in the rear wall of the main stator casing.

The main shaft 20 shown in FIG. 2 is shown as becoming progressively larger from the front to the rear of the engine but it will be understood that this form of main shaft is clearly not a necessary feature of the present engine. The main shaft has a key way 102 at its front end for the attachment of a pully, gear, or similar device. The front end of the main shaft may be used to drive accessories such as a generator or alternator if this is desired. Similarly, the rear end of the main shaft has a key way 103 for the attachment of a pully, gear, or similar device. If desired, the rear end of the main shaft may be used as the main power output means for the motor and thus could be used to drive the wheels of a car for example.

Sealing means are provided to seal a space between the front and rear walls of the main stator casing and the front and rear walls of the main rotor. In the engine of FIG. 1, the sealing means comprise arcuate sealing members mounted rigidly in the sides of the cylindrical outer casing 42 of the main rotor. Each sealing member 104 extends along the cylindrical outer casing from one primary vane to the next primary vane and is located a short distance inwards from the peripheral surface of the main rotor. The sealing members can be made of any suitable sealing material which is sufficiently wear resistant and which provides a good sealing surface with the main stator casing. As can be seen from FIG. 2, each side of the cylindrical outer casing 42 has a small cross sectionally rectangular recess in which one end of an arcuate sealing member is securely embedded. A further recess 106 of rectangular cross section is formed in the front and rear walls of the main stator casing and this recess extends completely about the circumference of the main rotor chamber. One end of each of the arcuate sealing members 104 projects into one of the recesses 106 at all times as the main rotor rotates so as to form a good seal between the sides of the main rotor and the sides of the main stator casing. The end of each arcuate sealing member 104 contained in the recess 106 should not be so large as to prevent the sealing member from sliding freely and easily in the recess as the rotor rotates.

Figure 3:
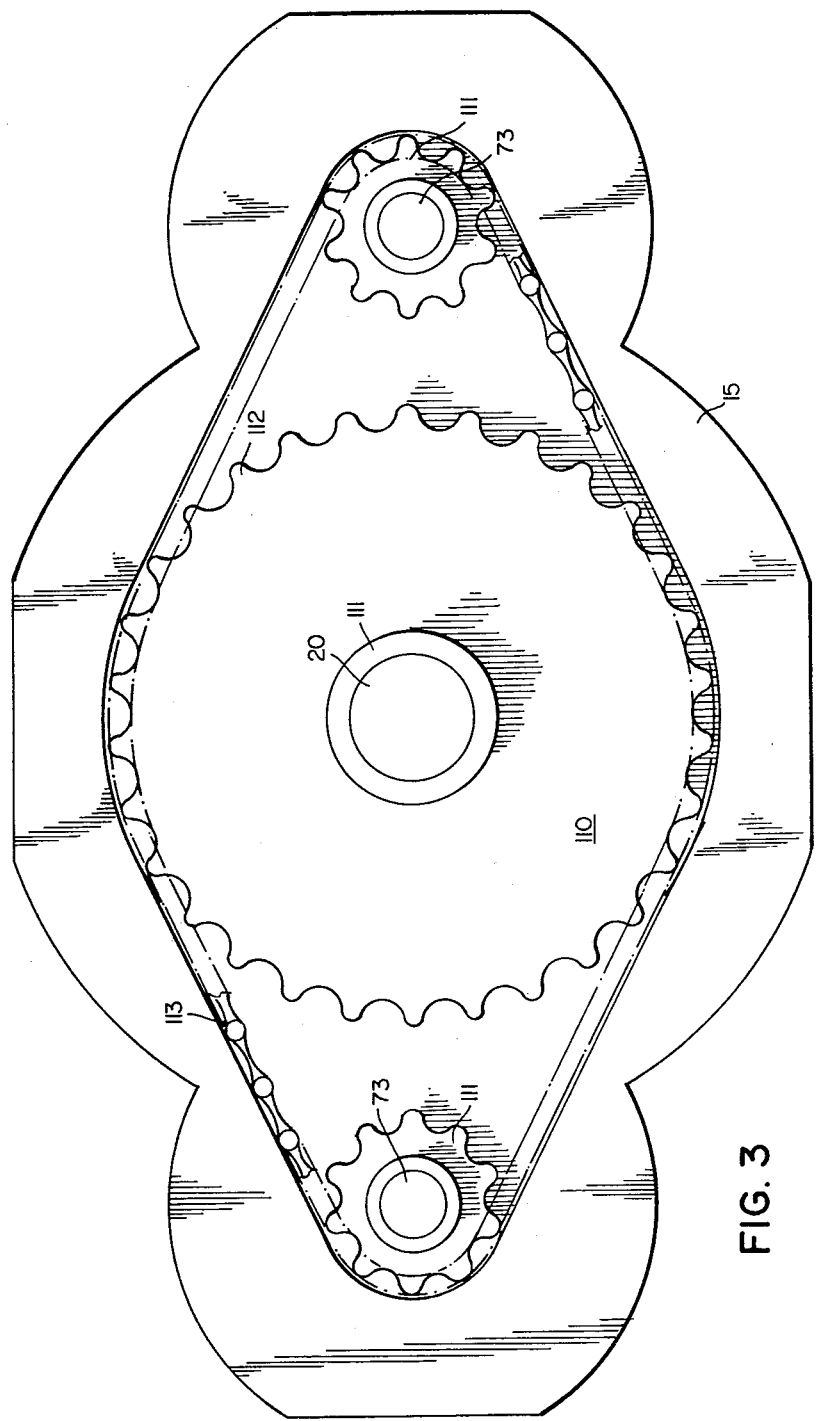
FIG. 3 is a schematic rear view of the engine of FIG. 1 showing the drive means for the two compression means.

In the engine of the present invention, the main shaft 20 for the main rotor 12 may be used to drive the compressor rotors 72 of the compression means. The interconnecting drive means between the main shaft and the shafts of the compressor rotors is arranged so as to drive the compressor rotors at the correct speed in relation to the speed of the main rotor. The drive means for the compressor rotors is best shown in FIGS. 2 and 3 of the drawings. Affixed to the rear end of the main shaft 20 is a large drive sprocket 110 which is mounted to rotate with the main shaft 20. The drive sprocket 110 may be fitted with a sleeve 111 which tightly engages a portion of the main shaft 20 and which helps to maintain the drive sprocket 110 perpendicular to the main shaft 20. Similarly, each of the rotatable shafts 73 on which the compressor rotates are mounted is fitted with a driven sprocket 111. Both the drive sprocket 110 and driven sprockets 111 are fitted with a number of teeth 112 which engage a chain member 113, shown only in part in FIG. 3. It will be readily seen that rotation of the drive sprocket 110 will drive the chain 113 at a fixed rate in relation to the speed of rotation of the drive sprocket. The chain 113 will in turn drive both of the driven sprockets 111 at a fixed rate in relation to the speed of rotation of the drive sprocket. In the engine of FIG. 1 which has three primary vanes on the main rotor and one vane mounted in each of the compressor rotors, the compressor rotors are driven so that they complete three complete revolutions for every complete revolution of the main rotor 12. Thus the drive sprocket 110 and driven sprockets 111 must be selected so that the circumference of the drive sprocket is three times the circumference of each of the driven sprockets. It should also be noted that the drive arrangement illustrated in FIG. 3 is such that each of the compressor rotors will be rotated in the same direction as the main rotor 12. For example if the main rotor 12 is rotating in a clockwise direction as shown in FIG. 1, the compressor rotors 72 will also be driven in a clockwise direction.

Figure 4:
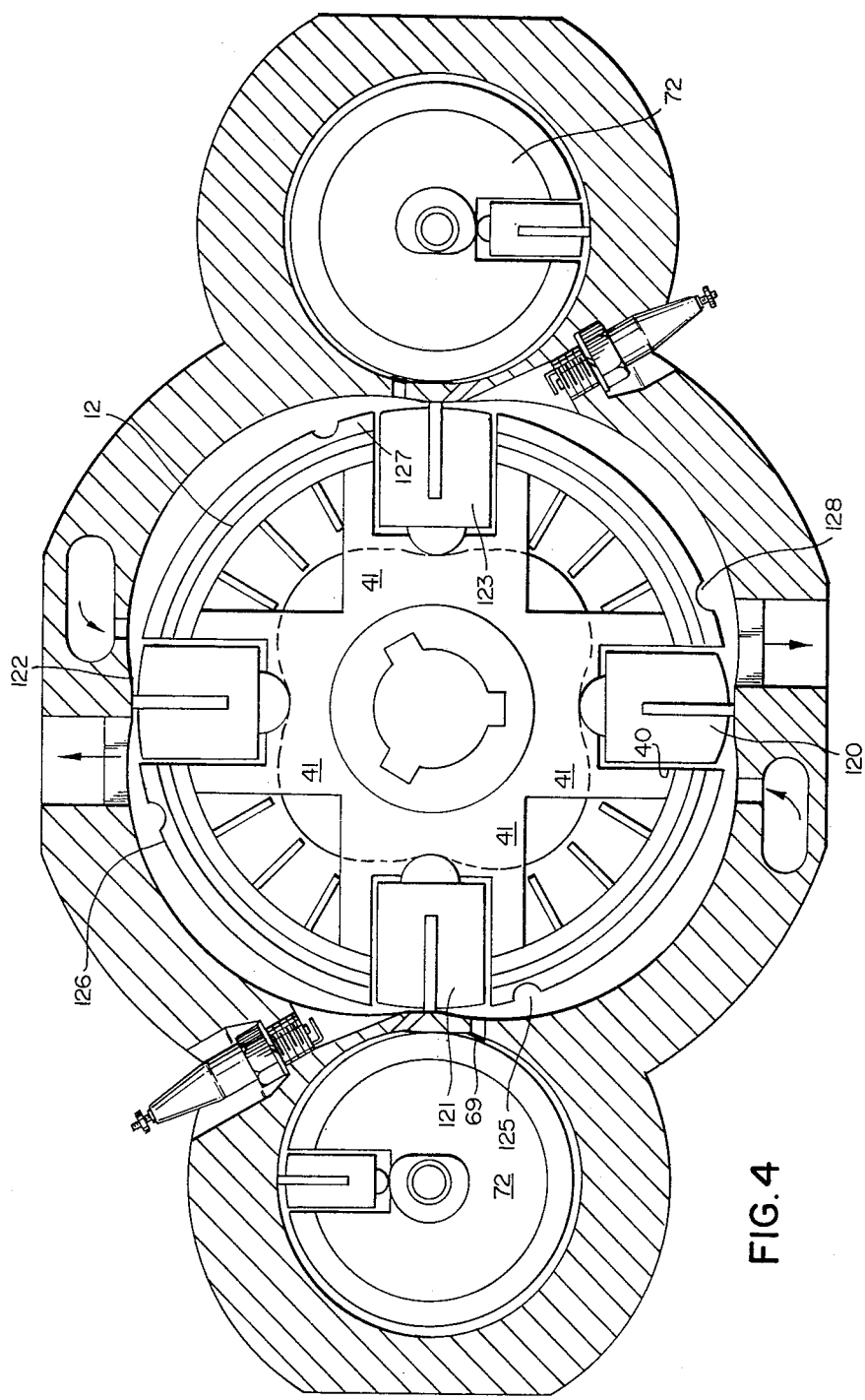
FIG. 4 is a sectional side view similar to FIG. 1 but showing another embodiment of the engine of the present invention having four primary vanes.

FIG. 4 illustrates another embodiment of the engine of the present invention which is identical to the engine of FIGS. 1 to 3 except that it is fitted with four primary vanes mounted in the main rotor 12 rather than three primary vanes. The four primary vanes are mounted in four vane passageways 40 which in turn are contained in four spokes 41. As in FIG. 1, a recess in the periphery of the main rotor 12 is provided a short distance behind each of the primary vanes taken in the direction of the main rotor. However, in the engine of FIG. 4, there are four recesses 125 to 128.

In the engine of FIG. 4, each of the compressor rotors 72 rotates four times for every single rotation of the main rotor 12.

The operation of the engine will now be described with respect to the engine shown in FIGS. 1 to 3 of the drawings but it will be understood that the embodiment of the invention shown in FIG. 4 operates in a similar manner with only slight modifications due to the differences in structure of the two embodiments.

Figure 5:
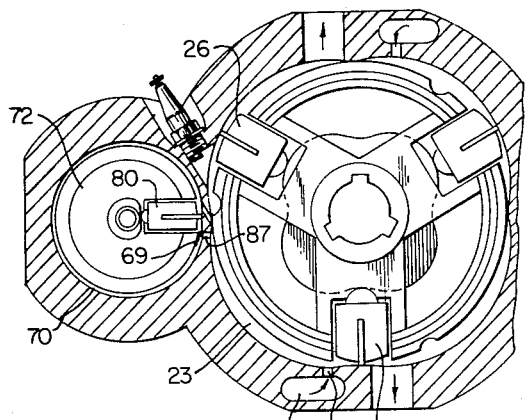
FIGS. 5 to 9 are schematic sectional view taken along the line I—I of FIG. 2 illustrating the main rotor and related assembly and the left compression means with the main rotor and the compression rotor at various stages of rotation with respect to their casings.

With reference to FIG. 5, this is a schematic representation of the engine of FIGS. 1 to 3 omitting the compression means on the right hand side. The right compression means operates in a manner similar to that of the compression means on the left hand side which is shown and therefore it is felt to be unnecessary to describe the operation of the compression means on the right hand side separately. In FIG. 5 the primary vane 26 is about to enter the intake chamber 23. The intake chamber is in open communication at this stage with the compression chamber 70 via the first passage means 87. The fuel and air mixture in the passageway 67 is free to enter the intake chamber 23 at this stage through the intake openings 25.

Figure 6:
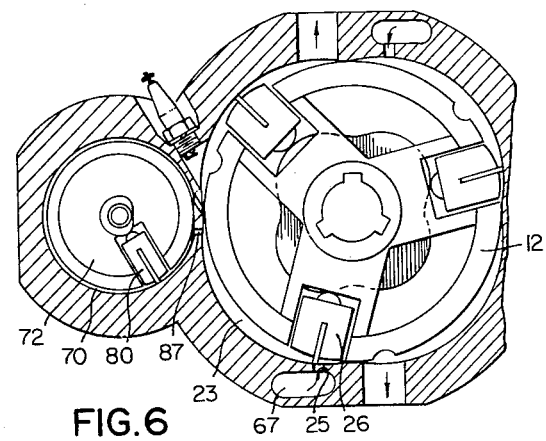

FIG. 6 is an illustration similar to FIG. 5 except that the main rotor 12 has rotated clockwise a short distance as has the compressor rotor 72. In this position, the primary vane 26 has rotated past the openings 25 and the compressor vane 80 has rotated past the first passage means 87. It will be seen that the fuel and air mixture which has already entered the intake chamber 23 and which is trapped in the intake chamber ahead of the primary vane 26 will be driven from the intake chamber into the compression chamber 70 as the vanes 26 and 80 are rotated in a clockwise direction. At the same time, a vacuum will tend to be created in the portion of the intake chamber 23 behind the primary vane 26 as the vane moves through the intake chamber. Thus, a suction effect is created to draw further amounts of the fuel and air mixture in the passageway 67 into the intake chamber 23.

Figure 7:
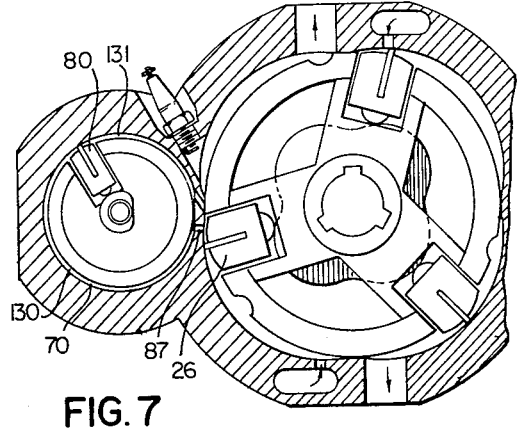

FIG. 7 illustrates the main rotor 12 after the primary vane 46 has been rotated almost entirely through the intake chamber and is about to pass over the first passage means 87. It will be noted that the compressor vane 80 has rotated over 180° through the combustion chamber 70 to divide the combustion chamber 70 into two separate chambers 130 and 131, with the first of these two chambers being located to the rear of the compressor vane 80 and the second of the chambers being located ahead of this vane. It should be noted that if the chamber 70 is constructed so as to have a volume less than the volume of the intake chamber ahead of the primary vane 26 in the position of FIG. 6, then the mixture of fuel and air trapped in the intake chamber at the stage of rotation of the main rotor shown in FIG. 6 will be compressed as it is driven from the intake chamber to the compression chamber. This partial pre-compression of the mixture of fuel and air before final compression of the mixture in the compression chamber is a preferred feature of the present engine as it permits the present engine to achieve a high degree of compression in the mixture of fuel and air before combustion takes place while at the same time not placing an undue strain on the engine parts. Because this initial pre-compression also permits a relatively smooth build up in compression, engine vibration is also reduced.

Figure 8:
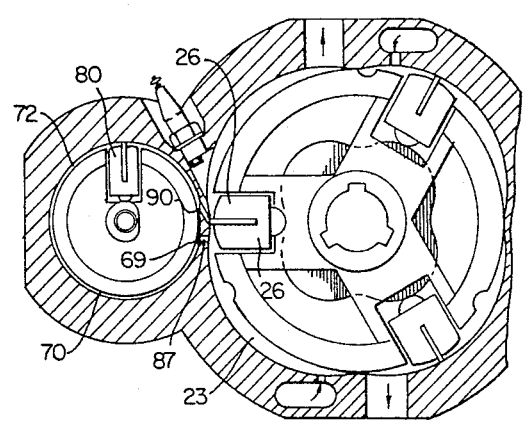

FIG. 8 illustrates the main rotor with the primary vane located immediately adjacent the second passage means 90. In this position the primary vane 26 has rotated past the first passage means 87 so that the entire intake chamber 23 is again in communication with the compression chamber 70 via first passage means 87. It will be noted that the compressor vane 80 has rotated still further in the clockwise direction from the position of FIG. 7 but this further rotation will only tend to reduce the pressure in the fuel and air mixture in the combustion chamber 70 an insignificant amount.

Since, in the position of FIG. 8, the compression chamber 70 and the entire intake chamber 23 are in communication, if an initial pre-compression is desired in the present engine as mentioned above the valve means 69 can be provided in the first passage means 87 to prevent the escape of the partially compressed mixture of fuel and air in the compression chamber back into the intake chamber 23 wherein the mixture of fuel and air is at a lower pressure.

Figure 9:
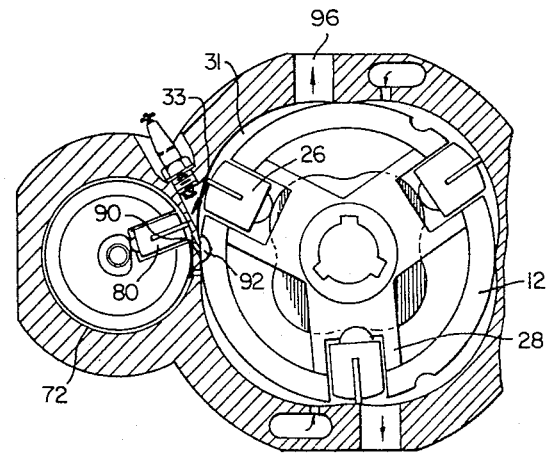

During rotation of the compressor vane 80 through the compression chamber 70 from the position shown in FIG. 6 to the position shown in FIG. 9, a quantity of the fuel and air mixture which is located ahead of the vane 80 undergoes final compression in the compression chamber, being trapped between the vane 80 and the end of the second passage means 90 which is closest to the main rotor 12. The rotor 12 seals this end of the second passage means at all times until the primary vane 26 and the compressor vane 80 reach the positions shown in FIG. 9. In the position shown in FIG. 9, the recess 92 located a short distance behind the primary vane 26 in the direction of rotation of the main rotor 12 is in open communication with both the second passage means 90 and one end of the combustion chamber 31. Thus, for a brief period of time, the second passage means is in communication with one end of the combustion chamber and during this period of time the highly compressed mixture of fuel and air located ahead of the vane 80 and in the second passage means 90 will be released into the combustion chamber. Once the recess 92 passes by the second passage means 90, the compressed mixture of fuel and air located in the combustion chamber behind the primary vane 26 is ignited by the spark plug 33. The force of the explosion in the combustion chamber then drives the primary vane 26 clockwise through the remainder of the combustion chamber. The exhaust gases remaining in the combustion chamber are then driven from the combustion chamber by the passage of the next following primary vane 28 through the combustion chamber 31. Primary vane 28 drives the combustion or exhaust gases from the combustion chamber 31 through the exhaust passageway 96.

Further clockwise rotation of the main rotor 12 and compressor rotor 72 results in these two rotors being positioned in the manner shown in FIG. 5 except that each primary vane has rotated 120° to take the position occupied by one of the other primary vanes in FIG. 5. The whole cycle described above then begins to repeat itself again with the mixture of fuel and air which has been driven into the combustion chamber 70 by the movement of the primary vane 26 through the intake chamber undergoing final compression in the compression chamber 70. A further quantity of fuel and air is drawn into the intake chamber by the passage of the primary vane 28 therethrough.

It will readily be seen that the engine shown in FIG. 1 has the ability to have six power strokes for every revolution of the main rotor. This is due to the fact that there is one power stroke on each occasion that one of the primary vanes passes through one of the combustion chambers. Since there are three primary vanes and each primary vane passes through two combustion chambers during every rotation of the main rotor, there must be six power strokes. It is obvious that a rotary engine having this capability will be able to develop a great deal of power. Thus, one of the advantages of the present engine is the ability which it has to develop great power while at the same time being of relatively simple construction and relatively light weight.

The engine illustrated in FIG. 4, as stated previously, operates in the same manner as the engine of FIGS. 1 to 3 except that there are eight power strokes for every rotation of the main rotor 12. Again this is the result of the fact that a power stroke occurs every time one of the four primary vanes passes through one of the combustion chambers. Since there are again two combustion chambers and each primary vane passes through both chambers during every revolution of the main rotor, there must be eight power strokes for every revolution.

It will be obvious to one skilled in the art that many variations of the engine of the present invention are possible. For instance, more than three or four primary vanes may be provided on the main rotor 12 and more than one compressor vane may be used on each of the compressor rotors 72. The number of primary vanes on the main rotor 12 will depend to some extent on such parameters as the maximum size of the engine permitted for the intended use, the amount of power required, the number of compressor vanes in each of the compressor rotors, and the speed at which the engine is to operate.

It is also obvious that two compression means are not necessary in order to operate an engine according to the present invention. For instance, if an engine is made with only one intake chamber and only one combustion chamber about the periphery of the main rotor 12, the engine will require only one compression means. It is also obvious that more than two compression means or compressors may also be used. For example, three or four compressors may be distributed evenly about the periphery of the main stator casing. Appropriate changes in the number of combustion chambers and intake chambers would of course have to be made if three or four compressors were used.

It should be understood that additional well known features can be incorporated in the engine of the present invention in order to provide a more efficient or longer lasting engine than those shown in the drawings. For instance, it would be obvious to those skilled in the art that a water cooling jacket could be incorporated into the main stator casing in order to cool the engine.

Another obvious advantage of the engine of the present invention is the ability to arrange a number of the engines such as the engine shown in FIG. 1 in tandem on a single power shaft. Thus a number of main rotors 12 may be arranged in parallel and adjacent planes on the power shaft with the compression means for each main rotor 12 being located at the periphery of each main rotor. If the compression means are located on the same shaft as the main rotor, such arrangements become more difficult and more complex to build.

Alternative means for maintaining a sealing contact between the outer end 44 of each of the primary vanes and the main stator casing are of course possible. In place of the cam means 50, it is possible to provide a large internal gear rigidly attached to the front wall 14 of the main stator casing in the same manner as the cam means. A planetary pinion gear would then be rotatably mounted on each of the spokes 41 radially inwardly from each primary piston. Each of these planetary pinion gears would rotate with the main rotor and would engage the teeth of the internal gear as it is rotated by the main rotor. The planetary pinion gear in turn rotates a shaft carrying a cam member rigidly fixed to the shaft. A connecting rod is pivotally connected to the inner end of each primary piston and extends inwardly to the cam member rotating on the shaft of the planetary pinion gear. The inner end of the connecting rod has a hole extending therethrough and the cam member is contained in this hole. Thus, as the cam member is rotated the connecting rod is moved inwardly and outwardly. It will be readily seen that by the described means each primary vane may be maintained in close contact with the adjacent surface of the main stator casing. If such planetary pinion gears were employed in the engine of FIG. 1 of the drawings, the internal gear and each planetary pinion gear would be arranged so that the planetary pinion gear would rotate three revolutions for each revolution of the main rotor. This assumes of course that the cam member is such that each revolution of the primary pinion gear causes the primary vane to be moved inwardly and outwardly once. Because such an arrangement provides positive means for drawing the primary vane inwardly as required, excessive amounts of friction between the outer end of each primary vane and the inner surfaces of the main stator casing are avoided.

What I claim as my invention is:

1. An internal combustion rotary engine comprising a main stator casing defining a main rotor chamber therein, a main rotor rotatably mounted in said main rotor chamber and combining with said main stator casing to form separate combustion chamber means and intake chamber means, primary vanes mounted in said main rotor, the radially outer end of each vane maintaining contact with an adjacent internal surface of said main stator casing during rotation of said main rotor, each primary vane passing through said combustion and intake chamber means respectively during rotation of said main rotor, intake passage means for transferring a mixture of fuel and air into said intake chamber means, exhaust passage means for transferring exhaust gases resulting from combustion out of said combustion chamber means, ignition means for igniting a mixture of fuel and air in said combustion chamber means, compression means for compressing a quantity of said mixture of fuel and air, said compression means comprising a compressor stator casing defining a compressor rotor chamber, a compressor rotor rotatably mounted in said compressor rotor chamber and combining with said compressor stator casing to form a compression chamber, said compressor stator casing being located radially outwardly from the centre axis of the main rotor and separated from said main rotor chamber, first passage means for transferring a quantity of said mixture of fuel and air in said intake chamber means to said compression chamber, second passage means for transferring a compressed quantity of said mixture of fuel and air from said compression chamber to said combustion chamber means, release means for releasing said compressed quantity of fuel and air into said combustion chamber means through said second passage means in timed relation with respect to the passage of each of said primary vanes through said combustion chamber means, wherein said release means comprise recesses in the periphery of the main rotor, one recess being located to the rear of and spaced apart a predetermined distance from each primary vane, the rearward position of each recess being relative to the direction of rotation of the main rotor and said predetermined distance determining the time of release of said compressed quantity into said combustion chamber.

2. An internal combustion rotary engine according to claim 1 wherein said main rotor has a hollow interior in open communication with said intake passage means and through which said mixture of gas and fuel passes before entering said intake passage means and said main rotor includes fin means disposed within said hollow interior for additional mixing of the mixture of fuel and air in said hollow interior.

3. An internal combustion rotary engine comprising a main stator casing defining a main rotor chamber therein, a main rotor of generally circular cross-section rotatably mounted in said main rotor chamber and combining with said main stator casing to form two combustion chambers and two intake chambers at the periphery of said main rotor, primary vanes mounted in said main rotor so as to maintain sliding contact with said main stator casing, each primary vane passing through each of said combustion and intake chambers during rotation of said main rotor, intake passage means for delivering a mixture of fuel and air into each of said intake chambers, exhause passage means for transferring exhaust gases out of reach of said combustion chambers, ignition means for igniting a mixture of fuel and air in said combustion chambers, two compression means for compressing a quantity of said mixture of fuel and air, each compression means comprising a compressor stator casing defining a compressor rotor chamber, a compressor rotor rotatably mounted in said compressor rotor chamber and combining with said compressor stator casing to form a compression chamber, said compressor stator casing being located radially outwardly from the centre axis of the main rotor and separated from said main rotor chamber, first passage means for transferring a quantity of said mixture of fuel and air in each of said intake chambers to a respective compression chamber, second passage means for transferring a compressed quantity of said mixture of fuel and air from each compression chamber to a respective combustion chamber, release means for releasing said compressed quantity of fuel and air into each of said combustion chambers through said second passage means in timed relation with respect to the passage of each of said primary vanes through each combustion chamber wherein said release means comprise recesses in the periphery of the main rotor, one recess being located to the rear of and spaced apart a predetermined distance from each primary vane, the rearward position of each recess being relative to the direction of rotation of the main rotor and said predetermined distance determining the time of release of said compressed quantity into each of said combustion chambers.

4. An internal combustion rotary engine according to claim 3 wherein there are four of said primary vanes distributed evenly about the circumference of said main rotor.

5. An internal combustion rotary engine according to claim 3 wherein each compressor rotor chamber has a generally cricular cross-section in the plane of rotation of its respective compressor rotor which is mounted to rotate about the centre of the compressor rotor chamber and each compressor stator casing sealingly contacts its respective compressor rotor at a location between the first passage means and the second passage means in communication with the compression chamber formed by the respective compressor rotor.

6. An internal combustion rotary engine according to claim 3 wherein said main rotor has a hollow interior in open communication with said intake passage means and through which said mixture of gas and fuel passes before entering said intake passage means and said main rotor includes fin means disposed within said hollow interior for additional mixing of the mixture of fuel and air in said hollow interior.

7. An internal combustion rotary engine according to claim 6 wherein there are three of said primary vanes distributed evenly about the circumference of said main rotor.

8. An internal combustion rotary engine accordance to claim 7 including chain drive means for each compressor rotor and wherein each compressor rotor and said main rotor is mounted on a separate rotatable shaft, said drive means including a single chain operatively connected to each of the shafts whereby rotation of said main rotor drives each of the compressor rotors.

* * * * *